United States Patent [19]

Kang

[11] Patent Number: 5,933,296
[45] Date of Patent: Aug. 3, 1999

[54] VIDEO CASSETTE RECORDER INCORPORATING THEREIN A HEAD BASE ASSEMBLY CAPABLE OF RETAINING A VIDEO HEAD CHIP IN A HORIZONTAL STATE

[75] Inventor: Dong-Ho Kang, Seoul, Rep. of Korea

[73] Assignee: Daewood Electronics Co., Ltd., Rep. of Korea

[21] Appl. No.: 08/977,685

[22] Filed: Nov. 24, 1997

[30] Foreign Application Priority Data

Dec. 30, 1996 [KR] Rep. of Korea ................ 96-78116

[51] Int. Cl.$^6$ ........................................... G11B 5/56
[52] U.S. Cl. ................................................ 360/109
[58] Field of Search ............................... 360/109

[56] References Cited

U.S. PATENT DOCUMENTS 4,441,128 4/1984 Ohba ........................ 360/109
4,507,696 3/1985 Hütter .

FOREIGN PATENT DOCUMENTS 0271167 6/1988 European Pat. Off. .
0720156 7/1996 European Pat. Off. .

Primary Examiner—A. J. Heinz
Attorney, Agent, or Firm—Pennie & Edmonds LLP

[57] ABSTRACT

A head base assembly for keeping a video head chip on a head drum assembly is provided with two parallel elastic plates positioned under the rotational drum. A first and a second spacers are closely attached on a bottom and an upper surfaces of the two elastic plates, being separated from each other. By using a fixing thread, the elastic plates and the second spacer are fixed to a rotational drum.

3 Claims, 5 Drawing Sheets

VIDEO CASSETTE RECORDER INCORPORATING THEREIN A HEAD BASE ASSEMBLY CAPABLE OF RETAINING A VIDEO HEAD CHIP IN A HORIZONTAL STATE

FIELD OF THE INVENTION

The present invention relates to a video cassette recorder ("VCR"); and, more particularly, to a head base assembly capable of retaining a video head chip on a head drum assembly in a horizontal state.

DESCRIPTION OF THE PRIOR ART

In general, a tape recorder, such as a video cassette recorder or a video camera, includes a head drum assembly containing a video head which is used to read/write signals on/off a magnetic tape running along a predetermined travel path on a deck.

One example of the conventional head drum assemblies is shown in FIG. 1. As shown, the head drum assembly 100 is largely divided into a rotational drum 110 on which a video head 15 is mounted and a stationary drum 120 fixed to the deck. As well known in the art, the video head 15 has to be precisely seated on the head drum assembly 100, taking into consideration such as its vertical position with respect to the head assembly, a degree of the video head's protruding out of a lateral surface of the head drum assembly, etc.

As shown in FIG. 2A, the video head 15 divided into a head chip 15b and a head base 15a is mounted on the rotational drum 110 through the use of a fixing thread 18 which is driven into a fixing thread hole 10 via the head base 15a. In order to adjust a height of the head chip 15b, an adjusting thread hole 11 and an adjusting thread 19 engaged into the adjusting thread hole 11 are provided.

However, the head drum assembly constructed in this manner has a shortcoming in that it is difficult for the head chip 15b to maintain its horizontal state during a height adjustment process. That is, as shown in FIG. 2B, the head base 15a is subjected to a downward deflection about the fixing thread 18 when the adjusting thread 19 is driven down to lower the position of the head chip 15b. As a result, the more lowered position the head chip 15b stays in, the more slanted the head chip 15b becomes. As shown in FIG. 2C, an exceedingly slanted condition of the head chip 15b makes it difficult for its apex 16 to come into contact with a surface of the magnetic tape T, since portion other than the apex 16 comes into contact with the magnetic tape T.

SUMMARY OF THE INVENTION

It is, therefore, a primary object of the invention to provide a video cassette recorder incorporating therein a head base assembly capable of keeping a video head chip in a horizontal state.

The above and other objects of the invention are accomplished by providing a video cassette recorder incorporating therein a device for retaining a video head chip on a head drum assembly divided into a rotational and a stationary drums, said device comprising: a first elastic plate positioned under the rotational drum; a first and a second spacers closely attached on a bottom surface of the first elastic plate, being separated from each other; a second elastic plate closely attached on bottom surfaces of the first and the second spacers and having said video head chip at its end of the first spacer side; and a fixing means for fixing the first and the second elastic plates and the second spacer on the rotational drum.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
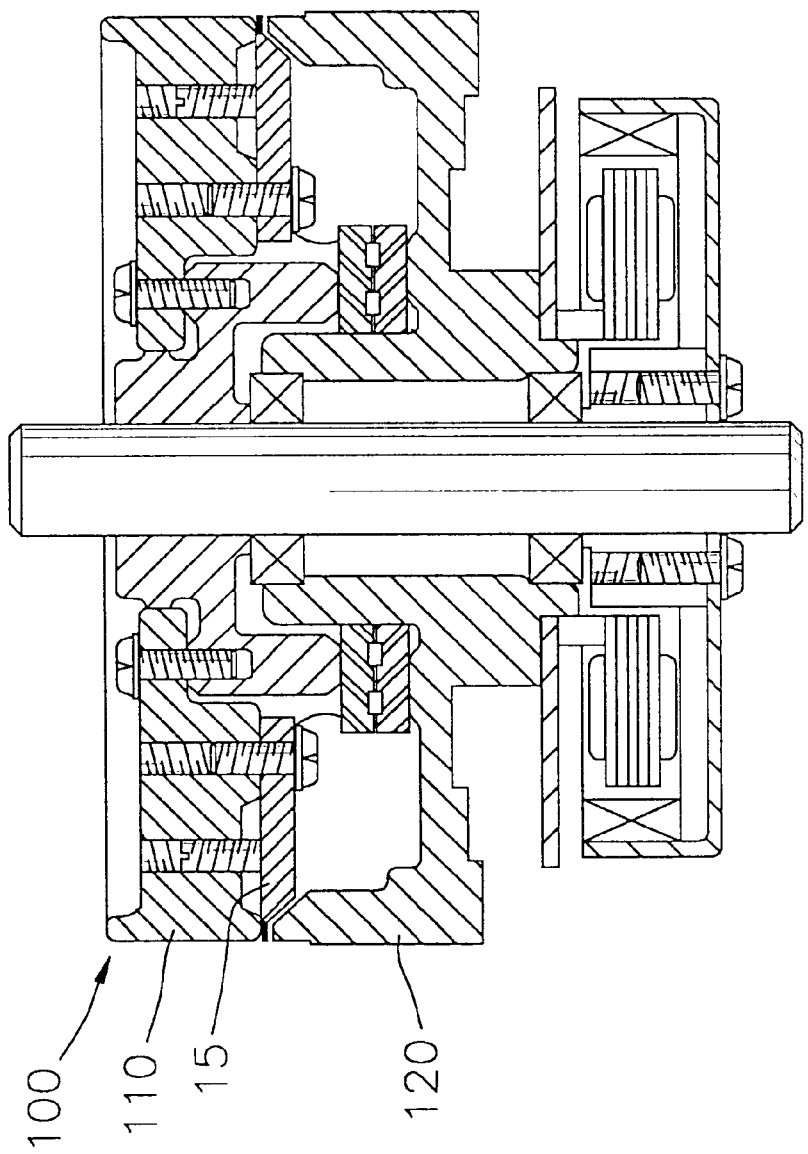
FIG. 1 illustrates a conventional head drum assembly.
Figure 2A:
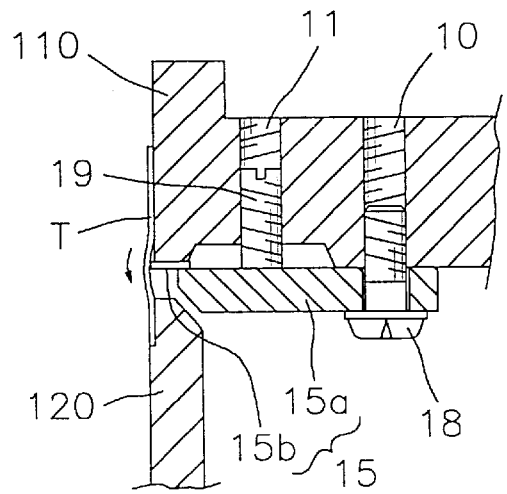
FIGS. 2A through 2C depict sectional views of a video head chip and a video head base in accordance with the prior art, respectively.
Figure 2B:
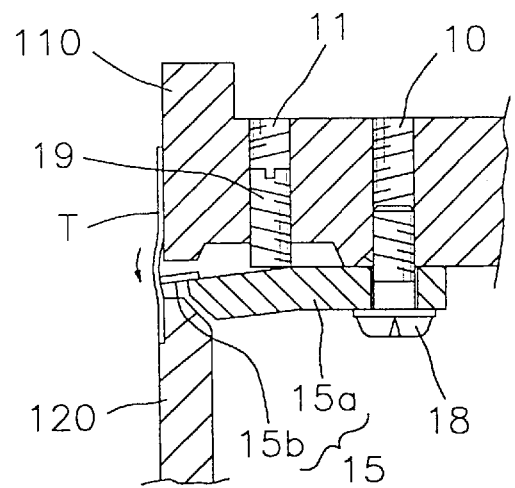
Figure 2C:
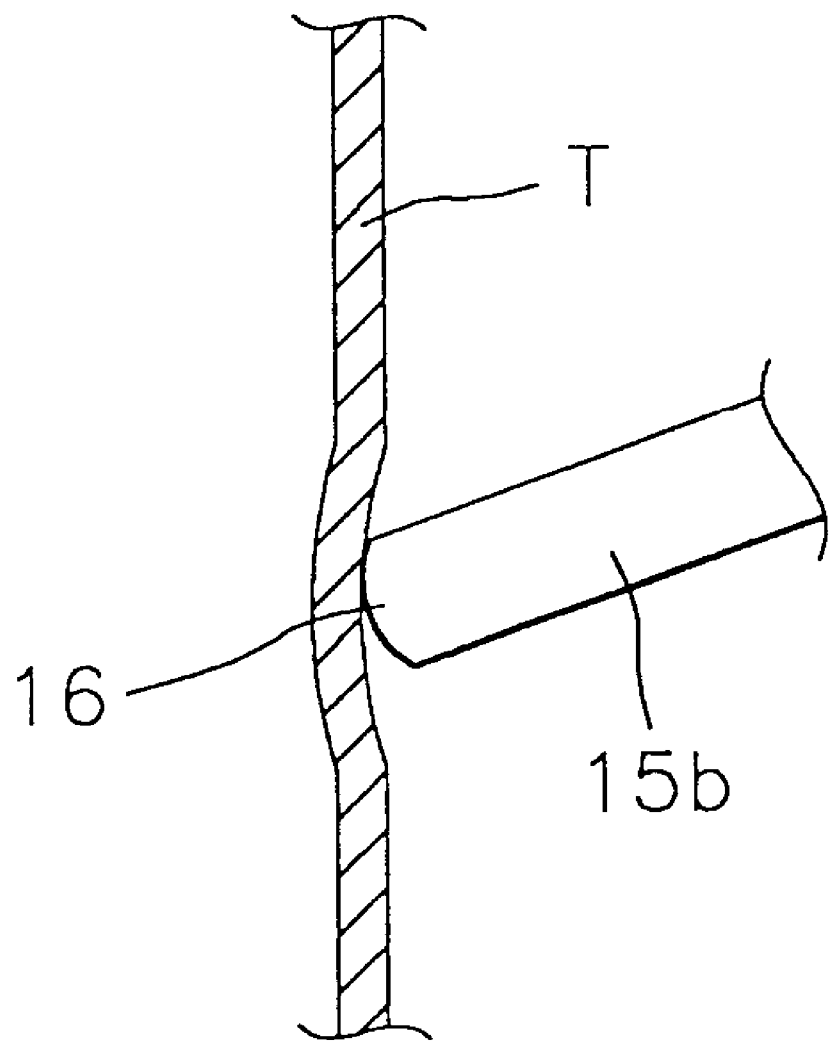
Figure 3:
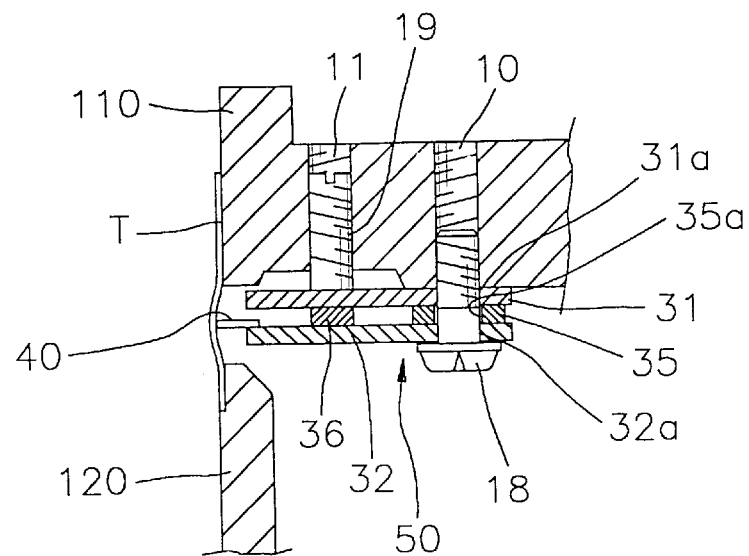
FIGS. 3 to 5 offer sectional views of a video head chip and a video head base in accordance with the present invention, respectively.
Figure 4:
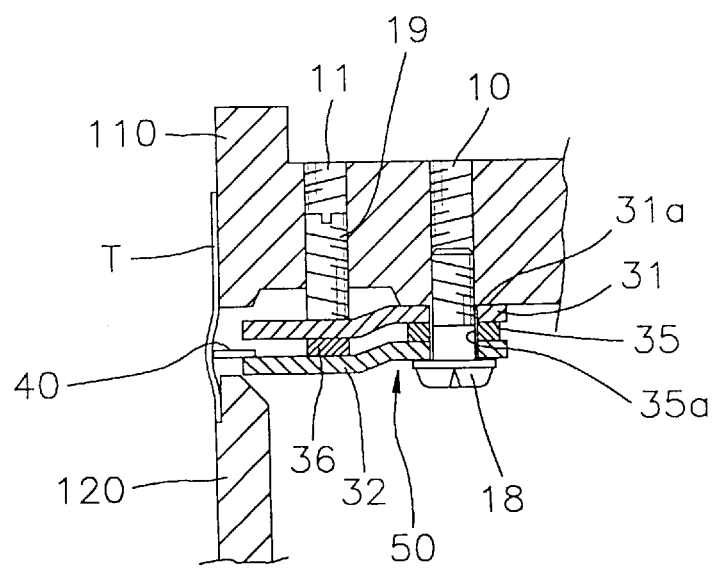
Figure 5:
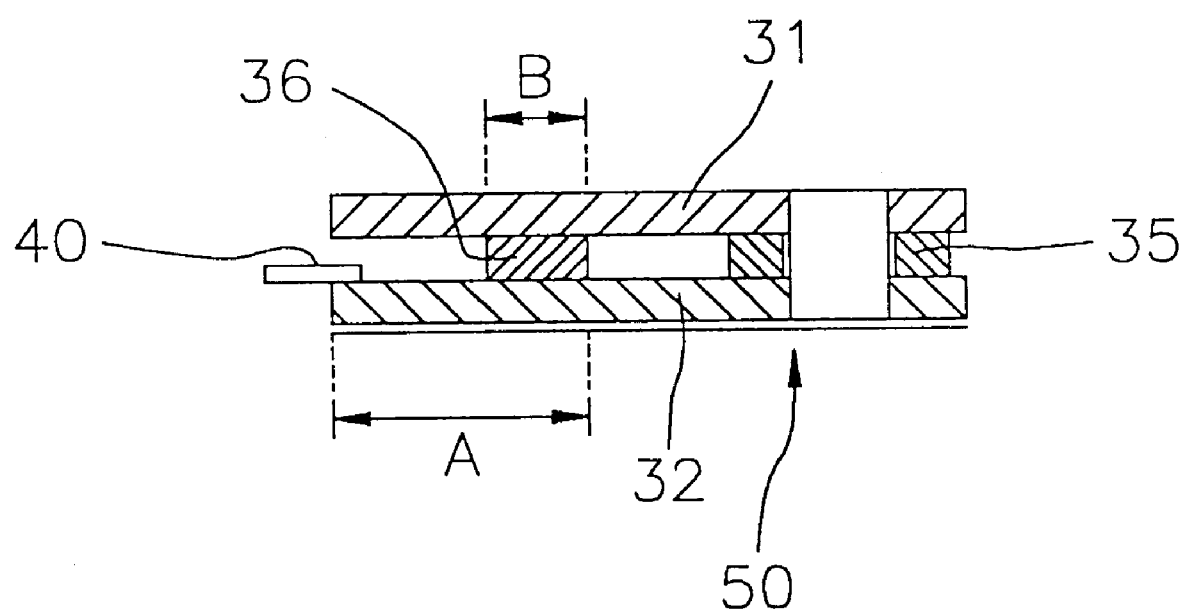

In FIGS. 3 to 5, there is shown a head base assembly 50 in accordance with the present invention. Although the main aspects of the present invention are shown in FIGS. 3 to 5, FIG. 2A will be from time to time referenced in describing the present invention. Furthermore, same reference numerals will be used to represent same components in FIGS. 2A, 3, 4 and 5.

As shown in FIG. 3, a video head divided into a head chip 40 and the head base assembly 50 is mounted on the rotational drum 110 through the use of a fixing thread 18 which is driven into a fixing thread hole 10. The head base assembly 50 is provided with a first elastic plate 31, a second elastic plate 32, a first spacer 36 and a second spacer 35.

The first elastic plate 31 which is downwardly and elastically deflectable contacts a lower surface of the rotational drum 110 at its one end in a substantially horizontal state. The second elastic plate 32 is positioned under the first elastic plate 31 in a parallel relationship therewith, being separated by the first and the second spacers 36 and 35. The second elastic plate 32 is also downwardly deflectable with a elasticity.

The first and the second spacers 36 and 35 being separated from each other are closely attached both on a bottom surface of the first elastic plate 31 and an upper surface of the second elastic plate 32. The second spacer 35 has a spacer-through hole 35a. Further, the first and the second elastic plates 31 and 32 have a first and a second through-holes 31a and 32a, respectively. After the spacer-through hole 35a and the first and the second through-holes 31a and 32a are aligned with one another, the head base assembly 50 is fixed on the lower surface of the rotational drum 110. The first spacer 36 is so located between the first and the second elastic plates 31 and 32 that, when the spacer-through hole 35a and the first and the second through holes 31a and 32a are aligned with one another, the first spacer 36 is brought under an adjusting thread hole 11.

By retaining a fixing thread 18 through the through-holes 31a, 32a and 35a, the first and the second elastic plates 31 and 32 and the second spacer 35 are fixed to the rotational drum 110. Further, an adjusting thread 19 is engaged within the adjusting thread hole 11.

A height adjusting process of the head base assembly in accordance with the present invention is described with reference to FIGS. 4 and 5.

As shown in FIGS. 4 and 5, when the adjusting thread 19 is driven down to press an upper surface portion of the first elastic plate 31 beneath which the first spacer 36 is located in order to lower the height of the head chip 40, the first and the second elastic plates 31 and 32 are deflected down between the first and the second spacers 36 and 35. At this moment, since the first spacer 36 is closely attached both on the bottom and the upper surfaces of the first and the second elastic plates 31 and 32, portions of the first and the second elastic plates 31 and 32 ranging within a section A stay horizontal. (see FIG. 5). In other words, a bottom surface of the first elastic plate 31 and an upper surface of the second elastic plate 32 ranging within a section B experience identical amounts of surface strain thereof to that of the first spacer 36. As a result, the first and the second elastic plates 31 and 32 in the section A can maintain their horizontal states.

On the other hand, on removing the pressing force by elevating the adjusting thread 19, the deflected portion of the first and the second elastic plates 31 and 32 are restored to its original shapes.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder incorporating therein a device for retaining a video head chip on a head drum assembly divided into a rotational and a stationary drums, said device comprising:

a first elastic plate positioned under the rotational drum;

a first and a second spacers closely attached on a bottom surface of the first elastic plate, being separated from each other;

a second elastic plate closely attached on bottom surfaces of the first and the second spacers and having said video head chip at its end of the first spacer side;

a fastener configured to attach the first and the second elastic plates and the second spacer on the rotational drums;

an adjusting thread hole formed with a lower surface of the rotational drum in such a way that it is substantially vertically aligned with the first spacer; and an adjusting thread engaged within the adjusting thread hole.

2. The video cassette recorder of claim 1, wherein the fastener comprises:

a first through hole formed through the first elastic plate;

a spacer through hole formed through the second spacer;

a second through hole formed through the second elastic plate;

a fixing thread hole formed with the lower surface of the rotational drum; and a fixing thread engaged within the fixing thread hole.

3. A video cassette recorder incorporating therein a device for retaining a video head chip on a head drum assembly divided into a rotational and a stationary drums, said device comprising:

a first elastic plate positioned under the rotational drum;

a first and a second spacers closely attached on a bottom surface of the first elastic plate, being separated from each other;

a second elastic plate closely attached on bottom surfaces of the first and the second spacers and having said video head chip at its end of the first spacer side; and a fastener configured to attach the first and the second elastic plates and the second spacer on the rotational drum, the fastener comprising:

a first through hole formed through the first elastic plate;

a spacer through hole formed through the second spacer;

a second through hole formed through the second elastic plate;

a fixing thread hole formed with the lower surface of the rotational drum; and a fixing thread engaged within the fixing thread hole.

* * * * *